United States Patent
Reese

(10) Patent No.: US 6,535,568 B1
(45) Date of Patent: Mar. 18, 2003

(54) METHOD AND SYSTEM FOR GENERATING THERMAL-MECHANICAL LIMITS FOR THE OPERATION OF NUCLEAR FUEL RODS

(75) Inventor: Anthony P. Reese, Wilmington, NC (US)

(73) Assignee: Global Nuclear Fuel -- Americas LLC, Wilmington, NC (US)

(*) Notice: Subject to any disclaimer, the term of this patent is extended or adjusted under 35 U.S.C. 154(b) by 126 days.

(21) Appl. No.: 09/678,665

(22) Filed: Oct. 4, 2000

Related U.S. Application Data

(60) Provisional application No. 60/173,561, filed on Dec. 30, 1999.

(51) Int. Cl.$^7$ .............................................. G21C 17/00
(52) U.S. Cl. ........................................ 376/245; 376/255
(58) Field of Search ................................ 376/207, 216, 376/260, 217, 245, 255, 435, 401; 148/672

(56) References Cited

U.S. PATENT DOCUMENTS

| | | | | |
|---|---|---|---|---|
| 4,581,196 A | * | 4/1986 | Sakagami et al. | 376/216 |
| 5,912,933 A | * | 6/1999 | Shaug | 376/216 |
| 5,991,352 A | * | 11/1999 | Taylor | 376/260 |
| 6,061,412 A | * | 5/2000 | Stucker | 376/217 |
| 6,310,929 B1 | * | 10/2001 | Hirukawa | 376/245 |

FOREIGN PATENT DOCUMENTS

| | | | | |
|---|---|---|---|---|
| JP | 04198895 | * | 11/1990 | |
| JP | 05323088 | * | 5/1992 | 17/10 |
| JP | 06148376 | * | 11/1992 | |
| JP | 10002987 | * | 6/1996 | |

* cited by examiner

Primary Examiner—Marc S. Hoff
Assistant Examiner—Craig Steven Miller
(74) Attorney, Agent, or Firm—Nixon & Vanderhye P.C.

(57) ABSTRACT

A method and system for demonstrating compliance of nuclear fuel rods with fundamental licensing criteria for fuel rod internal pressure during nuclear reactor operation is presented. A nuclear fuel rod evaluation process is performed during the fuel cycle design and licensing process for each operating cycle of a particular nuclear reactor. The evaluation process includes a rod-by-rod internal pressure analysis based on empirical data of actual operational power output levels of each fuel rod in the reactor core. A computer program constructs individual fuel rod power histories for each nuclear fuel rod in the reactor core based on empirical information acquired during previous fuel cycles and the projected operation of the reactor in an upcoming fuel cycle. Using the constructed power histories for each fuel rod, the program then computes thermal and mechanical overpower limits and a maximum internal pressure for each rod in the upcoming fuel cycle. Licensing compliance is demonstrated by confirming that the computed maximum internal pressure and maximum thermal and mechanical overpower stresses of any fuel rod for the upcoming fuel cycle is less than the fundamental licensing limits.

11 Claims, 4 Drawing Sheets

Pressure Ratio (95% confidence) = $\dfrac{P_{max,nom}}{P_{crit,nom} - 1.645 \sqrt{\sigma^2_{pcrit} + \sigma^2_{pmax}}}$ $P_{max,nom}$ = T-M analysis maximum nominal pressure
$P_{crit,nom}$ = 3212.9 psi
$\sigma_{pcrit}$ = 1071.1 psi
$\sigma_{pmax}$ = 399.4 psi

| BUNDLE ID | ROD TYPE | LOC. | TYPE | MAXIMUM ENR. | GAD | @PEAK PRES. PRES. EXPO. | END-OF-LIFE PRES. EXPO. | MAXIMUM EXP. | @NODE |
|---|---|---|---|---|---|---|---|---|---|
| GE3001 | 3 | (01,01) | REG | 2.80 | 0.0 | 583. 53.81 | 583. 53.81 | 66.36 | 9 |
| GE3001 | 3 | (02,01) | REG | 3.60 | 0.0 | 605. 53.80 | 605. 53.80 | 66.01 | 8 |
| GE3001 | 3 | (01,02) | REG | 3.60 | 0.0 | 605. 53.80 | 605. 53.80 | 66.01 | 8 |
| GE3001 | 3 | (03,01) | REG | 4.40 | 0.0 | 683. 55.59 | 683. 55.59 | 68.17 | 8 |
| GE3001 | 3 | (01,03) | REG | 4.40 | 0.0 | 683. 55.59 | 683. 55.59 | 68.17 | 8 |
| GE3001 | 3 | (04,01) | REG | 4.40 | 0.0 | 650. 54.18 | 650. 54.18 | 66.60 | 7 |
| GE3001 | 3 | (01,04) | REG | 4.40 | 0.0 | 650. 54.18 | 650. 54.18 | 66.60 | 7 |
| GE3001 | 3 | (05,01) | REG | 4.40 | 0.0 | 624. 53.61 | 624. 53.61 | 66.11 | 7 |
| GE3001 | 3 | (01,05) | REG | 4.40 | 0.0 | 624. 53.61 | 624. 53.61 | 66.11 | 7 |
| GE3001 | 3 | (06,01) | REG | 4.40 | 0.0 | 636. 53.90 | 636. 53.90 | 66.41 | 7 |
| GE3001 | 3 | (01,06) | REG | 4.40 | 0.0 | 636. 53.90 | 636. 53.90 | 66.41 | 7 |
| GE3001 | 3 | (07,01) | REG | 4.40 | 0.0 | 664. 54.88 | 664. 54.88 | 67.30 | 7 |
| GE3001 | 3 | (01,07) | REG | 4.40 | 0.0 | 664. 54.88 | 664. 54.88 | 67.30 | 7 |
| GE3001 | 3 | (08,01) | REG | 4.40 | 0.0 | 702. 56.43 | 702. 56.43 | 69.04 | 8 |
| GE3001 | 3 | (01,08) | REG | 4.40 | 0.0 | 702. 56.43 | 702. 56.43 | 69.04 | 8 |
| GE3001 | 3 | (09,01) | REG | 3.60 | 0.0 | 615. 54.64 | 615. 54.64 | 66.87 | 8 |
| GE3001 | 3 | (01,09) | REG | 3.60 | 0.0 | 615. 54.64 | 615. 54.64 | 66.87 | 8 |
| GE3001 | 3 | (10,01) | REG | 2.80 | 0.0 | 589. 54.55 | 589. 54.55 | 67.17 | 9 |
| GE3001 | 3 | (01,10) | REG | 2.80 | 0.0 | 589. 54.55 | 589. 54.55 | 67.17 | 9 |
| GE3001 | 3 | (02,02) | PAR | 4.40 | 0.0 | 493. 57.22 | 493. 57.22 | 63.81 | 7 |
| GE3001 | 3 | (03,02) | GAD | 4.90 | 7.0 | 751. 50.85 | 751. 50.85 | 63.77 | 6 |
| GE3001 | 3 | (02,03) | GAD | 4.90 | 7.0 | 751. 50.85 | 751. 50.85 | 63.77 | 6 |
| GE3001 | 3 | (04,02) | PAR | 4.90 | 0.0 | 474. 55.05 | 474. 55.05 | 61.80 | 6 |
| GE3001 | 3 | (02,04) | PAR | 4.90 | 0.0 | 474. 55.05 | 474. 55.05 | 61.80 | 6 |
| GE3001 | 3 | (05,02) | REG | 4.90 | 0.0 | 565. 49.89 | 565. 49.89 | 61.74 | 6 |
| GE3001 | 3 | (02,05) | REG | 4.90 | 0.0 | 565. 49.89 | 565. 49.89 | 61.74 | 6 |
| GE3001 | 3 | (06,02) | REG | 4.40 | 0.0 | 540. 48.15 | 540. 48.15 | 59.54 | 6 |

Fig. 5

METHOD AND SYSTEM FOR GENERATING THERMAL-MECHANICAL LIMITS FOR THE OPERATION OF NUCLEAR FUEL RODS

This application claims the benefit of U.S. Provisional Application No. 60/173,561 filed Dec. 30, 1999, the entire content of which is hereby incorporated by reference in this application.

TECHNICAL FIELD

This invention relates generally to methods for demonstrating compliance of a nuclear reactor with fundamental licensing criteria for nuclear fuel rod internal pressure, and more particularly to a method for establishing thermal-mechanical limits for the use and operation of nuclear fuel rods.

BACKGROUND

Most countries have some sort of regulatory body or commission for administering the safe use and distribution of nuclear fuels and power generation within their jurisdictions. In the United States of America, for example, the Nuclear Regulatory Commission (USNRC) is the primary governmental regulatory body that is responsible for licensing the construction and operation of nuclear power plants. In its regulatory capacity, the USNRC is responsible for setting up and reviewing fundamental safety criteria for granting a license for the operation of a nuclear reactor. Under such review, an applicant for a license must be able to demonstrate that the operation of a particular reactor complies with fundamental safety criteria set forth by the USNRC. Reactor design and operation evaluation procedures are proposed and, once approved by the USNRC, may form the basis for the granting of an operating license.

Procedures for demonstration of compliance typically include (among other things) providing statistical/empirical evidence showing that the fuel rods within a reactor function within a given margin of safety at or below some predetermined power level that will ensure that the thermal and mechanical stresses on the fuel rod cladding for all rods in the reactor core are kept at a safe level during the life and use of the fuel—for example, to prevent any cracking or ruptures of fuel rod cladding and subsequent leaking of contaminates. Reactor operating limits are established to ensure that reactor operation is maintained within a fuel rod thermal-mechanical design and safety analysis basis. These operating limits may be defined, for example, by the maximum allowable fuel pellet operating power as a function of fuel pellet exposure level—usually expressed in terms of the maximum linear heat generation rate (MLHGR) (i.e., the maximum heat generated by a fuel rod per unit length of the rod (Kw/ft) verses exposure (Gwd/mt)).

As an example, under GE Company's USNRC approved "GESTAR" licensing basis, it is required that fuel design Thermal-Mechanical (T-M) analysis for a reactor be performed using the following conditions: (i) either worst tolerance assumptions are applied or probabilistic analysis are performed to determine statistically bounding results (i.e., upper 95% confidence), and (ii) operating conditions are taken to bound the conditions anticipated during normal steady-state operation and anticipated operational occurrences (AOOs). Based on the T-M analysis performed, operating limits are established to ensure that actual fuel operation is maintained within the fuel rod thermal-mechanical design and safety basis. These operating limits define the maximum allowable fuel pellet operating power level as a function of fuel pellet exposure.

The conventional methodology for designing thermal-mechanical (T-M) operational limits for fuel rods is to apply a bounding power history analysis on a single hypothetical fuel rod. For example, fuel rods may be evaluated to ensure that the effects of fuel rod internal pressure during normal steady-state operation will not result in fuel failure due to an excessive fuel rod cladding pressure loading. Such an evaluation is based, for example, on the amount of fission gas released by the uranium fuel pellets in a fuel rod and the resultant pressure within the rod to determine the cladding creep-out rate due to internal gas pressure during normal steady-state operation. (For example, a T-M performance analysis program, such as GE Company's GESTR-MECHNICAL (GSTRM) performance code program, may be used to evaluate a fuel rod.) A generic power limit curve is developed from the T-M evaluation which provides an operating envelope that is valid for the operation of fuel rods in every fuel cycle for all reactors. An example of such a fuel T-M limit envelope is illustrated by curve 10 in the graph of FIG. 1 which shows the maximum linear heat generation rate (LHGR) versus pellet exposure.

In developing such a generic operating limit envelope, typically only the fuel rod or rods within a reactor core that experience the maximum expected power and exposure conditions are evaluated. However, it is known that no single fuel rod in a reactor core actually operates with a power history equivalent to its limiting power history, but rather operates substantially below the limiting power for a majority of its operational duty. Prior to the present invention, it has been unfeasible to identify which fuel rods or rod within the core may be operating in the most limiting manner with regard to internal fission gas release. In this regard, the conventional approach of developing a bounding power history for generating thermal-mechanical limits for fuel rods is overly conservative and unnecessarily restricts the operation of nuclear reactors below an optimum level.

DISCLOSURE OF THE INVENTION

The method of the present invention overcomes the above limitations by constructing actual power history profiles for every fuel rod in the reactor core and evaluating the internal pressure for each fuel rod individually. Conventional computer programs for generating a power history for an individual fuel rod based on reactor design or actual reactor operations are known. For example, around about the year 1987, General Electric Company developed a computer program called "LERN". The LERN program is capable of generating a power history profile for a single fuel rod and is typically used, for example, to perform special studies for particular fuel rods (one at a time). In the present invention, fuel rod power histories are constructed for each rod in the reactor core using both pre-acquired historical operating data of each fuel rod during past fuel cycles and a projection of reactor operations into an upcoming fuel-cycle.

In implementing the method of the present invention, a computer program may employ the above described LERN-type technology or equivalent software to evaluate individual fuel rod power histories for each nuclear fuel rod in the reactor core based both on empirical information acquired during previous fuel cycles and a projected operation of the reactor in an upcoming fuel cycle. Using the constructed power histories for each fuel rod, the program then performs a rod-by-rod internal pressure analysis wherein it computes thermal and mechanical overpower limits and a maximum internal pressure for each rod in the upcoming fuel cycle to determine which rod or rods are operating with the most limiting power history—i.e., closest to its internal pressure, and thermal and mechanical overpower limits. The power history of this fuel rod or rods is then used as the basis for setting safe operational limits, and determining compliance with U.S. NRC requirements, rather than relying on an overly conservative conventional bounding power history analysis (which is typically based solely on a single hypothetical fuel rod). Compliance of reactor operation with U.S. NRC licensing requirements is demonstrated by confirming that the fuel rod identified as having the maximum fuel rod internal pressure or thermal and mechanical overpower stresses for the upcoming fuel cycle does not violate the particular fundamental licensing criteria.

Preferably, the above fuel rod evaluation process is performed for each operating fuel-cycle of a reactor. By using this T-M limit setting approach, higher peak operating powers for each rod may be used without violating fundamental safety and governmental imposed criteria for reactor operation. Moreover, implementation of the disclosed method of the present invention allows operation of a reactor using a much less restrictive fuel rod thermal-mechanical limit and, consequently, results in substantial improvements in operational fuel costs and power output.

In one aspect, the present invention is an improved method for determining/establishing power limit criteria for a nuclear reactor based on the operational history of the fuel rods in the nuclear reactor core. The improved method results in a realization of greater operating margins for the fuel rods in the reactor core—which in turn results in more efficient and cost effective core operation and/or fuel rod configurations. In this regard, the present invention also provides a more direct and less conservative approach toward illustrating compliance of a nuclear reactor with USNRC licensing requirements than the overly conservative processes conventionally used for such purposes.

In another aspect, the present invention is a data processing system including a computer having memory and various I/O or display devices that is programmed for determining power limit criteria of a nuclear reactor based on computed internal pressures of each fuel rod in the core; and for optional compilation and display of individual power histories and internal pressures for each fuel rod in the core.

In accordance with yet another aspect, the present invention is a computer program product that may be embodied on any computer-readable medium for distribution and/or storage on a computer system for execution to establish power limit criteria for a nuclear reactor based on the operational thermal-mechanical limits of the fuel rods in the nuclear reactor core.

In accordance with yet a further aspect of the present invention, a method and system is provided for demonstrating compliance of a nuclear reactor with fundamental licensing criteria for nuclear fuel rod internal pressure during nuclear reactor operation.

BRIEF DESCRIPTION OF THE DRAWINGS

FIG. 5 is an example output listing of rod-by-rod evaluation results provided in a preferred implementation of the present invention.

BEST MODE FOR CARRYING OUT THE INVENTION

The present invention may be implemented, for example, via FORTRAN computer program code executed using Digital Equipment Corp. Alpha computers running the Open VMS operating system. As embodied in a computer program for execution on a computer, the present invention determines actual power histories of each fuel rod in the reactor core using empirical data acquired from past operation of the reactor and evaluates the internal pressure for each fuel rod for an upcoming fuel cycle. Preferably, this rod evaluation process is performed during the fuel cycle design and licensing process for each operating cycle of a particular nuclear reactor. The evaluation process includes a rod-by-rod internal pressure analysis based on empirical data of actual operational power output levels of each fuel rod in the reactor core. A computer program constructs individual fuel rod power histories for each nuclear fuel rod in the reactor core based on information acquired during previous fuel cycles and a projected operation of the reactor in an upcoming fuel cycle. Using the constructed power histories for each fuel rod, the program then computes thermal and mechanical overpower limits and the maximum internal pressure for each rod in the upcoming fuel cycle. Licensing compliance is demonstrated by confirming that the computed maximum internal pressure for the upcoming fuel cycle is less than the critical pressure with a statistical confidence mandated by the regulatory agency and that the maximum thermal and mechanical overpower stresses of the fuel rods are below regulatory maximums.

Figure 1:
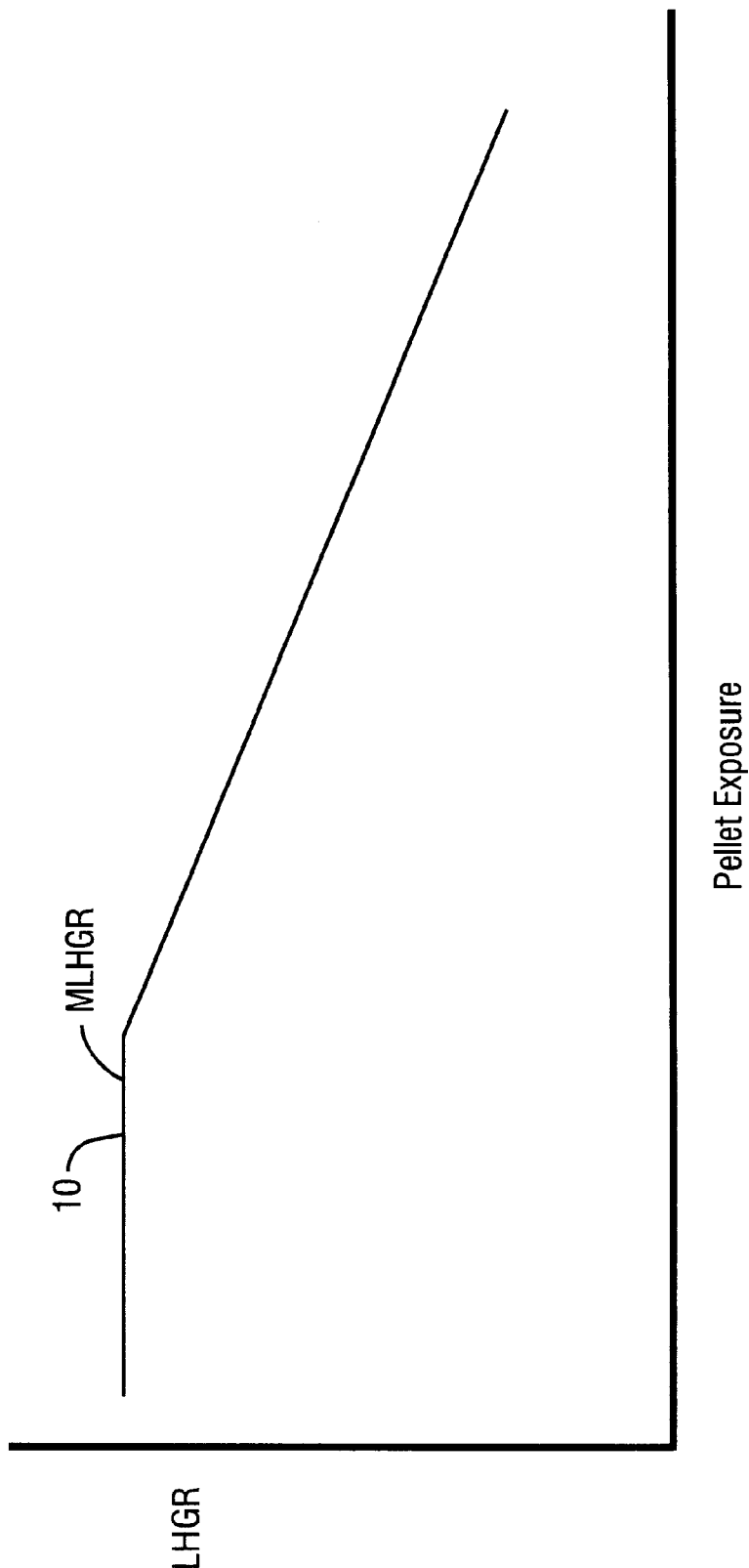
FIG. 1 is a graph illustrating an example T-M limit envelope curve for evaluating nuclear fuel rods.

FIG. 1 shows a graph illustrating an example thermal-mechanical limit envelope 10 for evaluating fuel rods. The envelope represents the operating limit maximum linear heat generation rate (MLHGR) for a fuel rod as function of fuel pellet exposure.

Figures 2, 3:
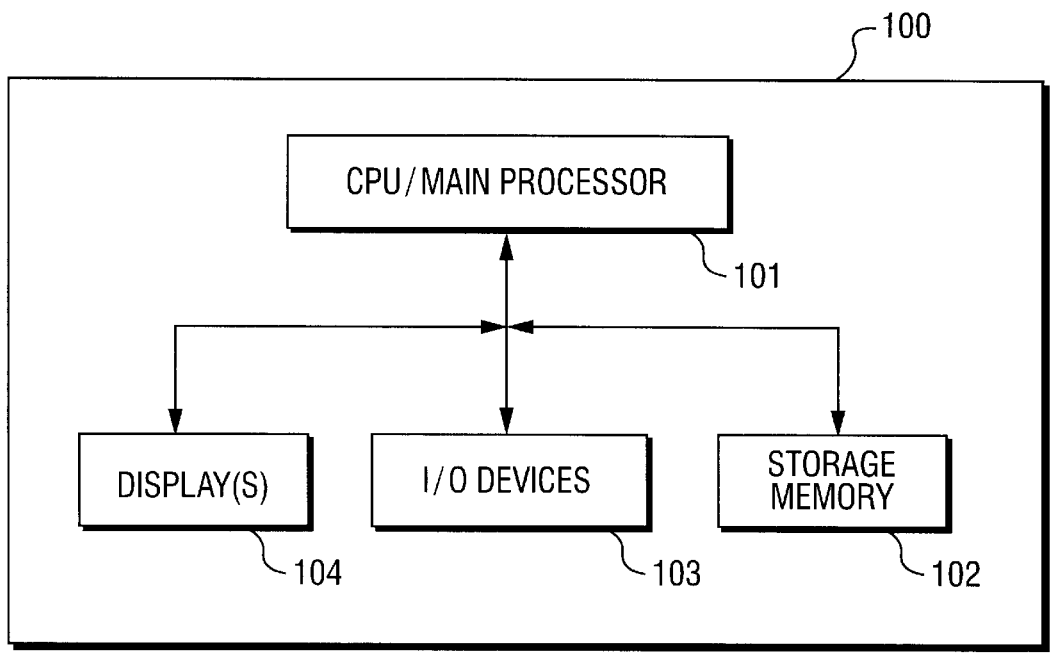
FIG. 2 is block diagram of an example data processing system used for simulation/modeling of thermal-mechanical limits for nuclear fuel rods.
FIG. 3 illustrates an example mathematical formula used to determine the pressure ratio for a fuel rod.

FIG. 2 shows a simplified block diagram of an example data processing system, 100, contemplated for performing the evaluation of fuel rod thermal-mechanical limits for each rod in a reactor core in accordance with the method of the present invention. Essentially, system 100 includes CPU 101, storage memory 102, and user interfacing I/O devices 103 and optionally one or more displays 104. Storage memory 102 includes a database or files (not shown) containing, for example, reactor plant initial state information, fuel lattice physics analysis results, 3D simulation results, fuel rod type/characteristics data and a program for evaluating fuel rods in accordance with the method of the present invention.

FIG. 3 shows a mathematical relationship useful for computing an internal pressure ratio of a fuel rod—for producing pressure ratio values believed reliable to a 95% degree of confidence. The Pressure Ratio value obtained using this equation is based on the ratio between a maximum nominal internal pressure, $P_{max,nom}$, and a nominal critical internal pressure, $P_{crit,nom}$, for a fuel rod. $P_{max,nom}$ may be determined by performing a conventional T-M type analysis on a fuel rod, for example, as produced by GE's GESTR performance software.

Figure 4:
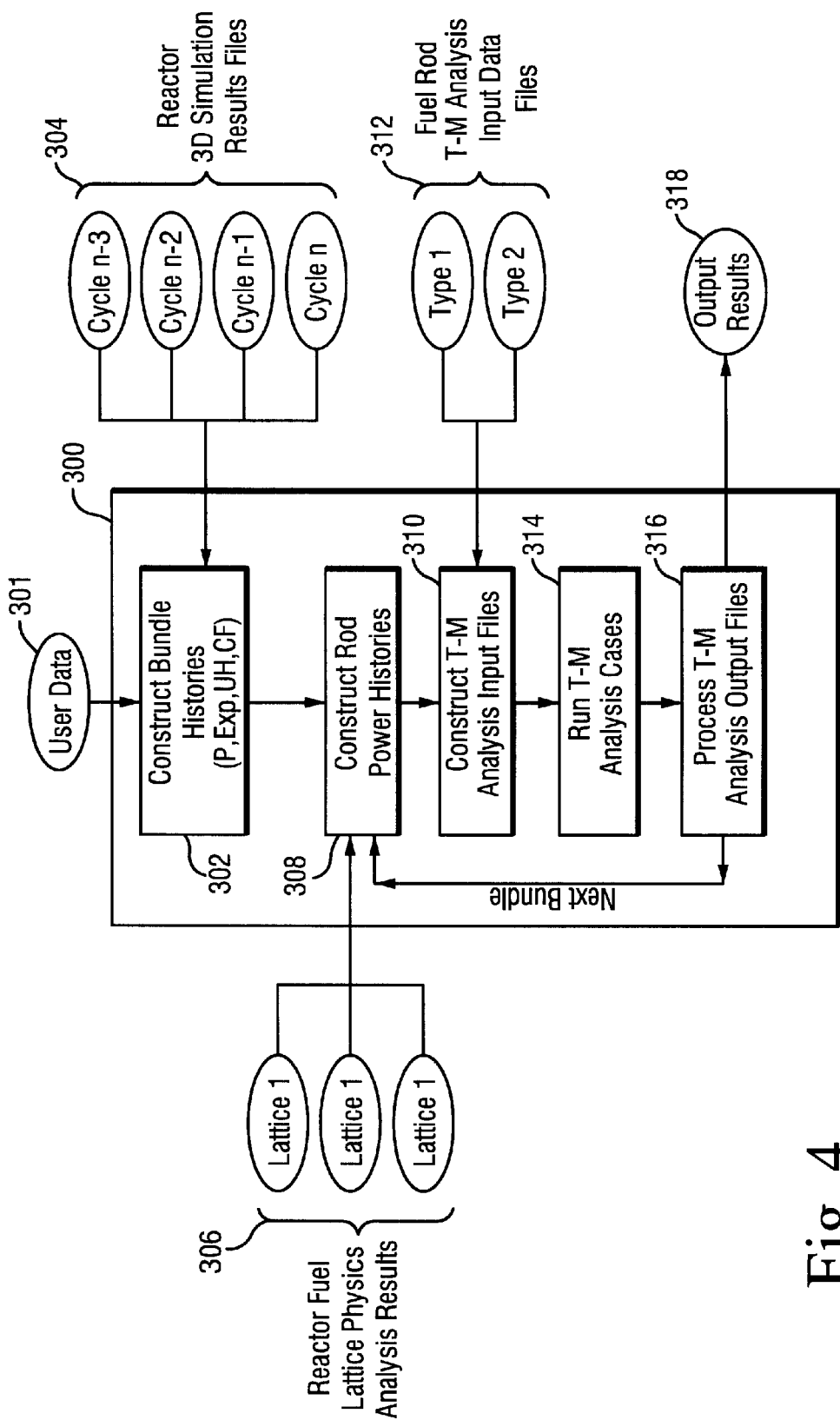
FIG. 4 is a flow chart illustrating an example sequence of process steps executable by a data processing system for performing an evaluation of fuel rod thermal-mechanical limits.

FIG. 4 shows a functional program flow diagram of an example embodiment of the fuel rod evaluation program of the present invention. Each block of the diagram contains a concise explanation of a functional step performed, for example, by a computer program operating on a single or multi-processor computer system for the purpose of evaluating the thermal-mechanical limits for all fuel rods in a reactor core. One of ordinary skill will appreciate that the illustrated functional steps of FIG. 4, although explained in greater detail below, are essentially self explanatory and may be implemented on a conventional computer by utilizing conventional programming techniques and programming tools well known in the art.

As illustrated by the functional flow diagram of FIG. 4, the method of the present invention essentially involves examining all fuel rods within each fuel bundle in a reactor core on a rod-by-rod basis to determine internal pressure data for each fuel rod and then using that information to set appropriate limiting operational criteria for the reactor. First, fuel rod power "histories" are constructed based on operating data from reactor process computers and data provided from pre-assembled data files (e.g., reactor 3D simulation files 304, reactor fuel lattice physics analysis files 306, and T-M analysis files 312). The reactor specific information provided by these data files may be pre-acquired and digitally stored by conventional means using standard procedures and processes well known in the nuclear industry. The fuel rod power histories are then used to perform T-M analysis for each rod individually.

Referring to program flow diagram 300 of FIG. 4, fuel bundle "histories", block 302, are first constructed using "historical" fuel-cycle data stored in a set of stored input files 304 (e.g., GE's PANAEA CEDAR files). This historical fuel-cycle data is produced as a result of running 3D simulations of the reactor for operating conditions covering previous fuel cycles (e.g., cycle n−3 through cycle n−1) and the projected operating conditions for the upcoming cycle (cycle n). At this time, other reactor specific operational parameters relevant to constructing fuel bundle histories may be input as user data 301. The bundle histories so constructed may comprise, for example, fuel rod axial power rating (P), fuel rod exposure data (Exp), water density history (UH) and control fraction data (CF).

Next, at block 308, individual fuel rod power histories are developed using the constructed fuel bundle history data and data obtained from a second set of input files 306 (containing reactor fuel lattice analysis data (e.g., GE's TGBLA files). Next, at block 310, T-M analysis input files are constructed for running T-M analysis cases using a third set of input files 312 containing fuel rod specific data (e.g., GE's GSTRM files). Next, at block 314, the T-M analysis cases for each rod are run and output files are produced. Finally, at block 316, the T-M output files are processed to provide output results, block 318, for each fuel rod for printing or display and then a next fuel bundle is examined. Output results 318 include at least peak pressure and exposure data for such rod and may further include other relevant information such as:

end-of-life pressure/exposure, maximum exp./mode, maximum enrichment/GAD.

This process continues until all bundles in the core are evaluated. FIG. 5 shows an example listing of rod-by-rod output results provided in the preferred implementation of the present invention.

What is claimed is:

1. A method for determining power limit criteria for a nuclear reactor based on operational thermal-mechanical limits of fuel rods in the nuclear reactor core, comprising the steps, executed by a computer, of:

a) constructing individual fuel rod power histories for each nuclear fuel rod in the reactor core based on information acquired during previous fuel cycles and a projected operation of the reactor in an upcoming fuel cycle;

b) computing internal pressure data for each fuel rod in the core for an upcoming fuel cycle based on the power histories constructed in step (a);

c) identifying a fuel rod as having a greatest computed internal pressure as computed in step (b); and d) establishing an operational thermal-mechanical limit based on the power history of the identified fuel rod.

2. The method of claim 1 wherein step (b) includes computing thermal and mechanical overpower limits for fuel rods in the core.

3. The method of claim 1 wherein steps (b) through (d) are repeated for each fuel cycle.

4. A method for establishing power limit criteria of a nuclear reactor based on operational thermal-mechanical limits of fuel rods in the nuclear reactor core, comprising the steps of:

a) computing power history data for each fuel rod in the reactor based on historical operating data of the reactor;

b) computing fuel rod internal pressure data for each fuel rod in the reactor core based on a computed power history data of a fuel rod and a projected operation of the reactor in an upcoming fuel cycle;

c) identifying a maximum fuel rod internal pressure for the upcoming fuel cycle based on the fuel rod internal pressure data computed in step (b); and d) confirming that the identified maximum is less than fundamental criteria established by the applicable licensing authority.

5. The method of claim 4, further including:

repeating steps (b) and (c) for each fuel cycle of the reactor.

6. A system for establishing power limit criteria for a nuclear reactor based on operational thermal-mechanical limits of fuel rods in the nuclear reactor core, said system comprising a computer including a data storage memory and one or more I/O or display devices, said computer programmed to:

(i) construct individual fuel rod power histories for each nuclear fuel rod in the reactor core based on empirical information acquired during previous fuel cycles and the projected operation of the reactor in an upcoming fuel cycle;

(ii) compute internal pressure data for each fuel rod in the core for an upcoming fuel cycle based on the individual power histories; and (iii) identify a fuel rod having a maximum internal pressure; wherein an operational power limit criteria is established based on thermal-mechanical limit data associated with the identified fuel rod.

7. The system of claim 6 wherein the computer is further programmed to compute thermal overpower and mechanical overpower limit data for each fuel rod in the reactor core.

8. The system of claim 6 wherein the computer provides, via an I/O or display device, output data identifying at least peak internal pressure and exposure information for one or more fuel rods in the reactor core.

9. A computer program product embodied on a computer-readable medium for distribution and/or storage on a computer system for execution to establish power limit criteria for a nuclear reactor based on operational thermal-mechanical limits of fuel rods in the nuclear reactor core, comprising:

means for constructing individual fuel rod power histories for each nuclear fuel rod in the reactor core based on empirical information acquired during previous fuel cycles and the projected operation of the reactor in an upcoming fuel cycle; and means for computing internal pressure data for each fuel rod in the core for an upcoming fuel cycle based on individual fuel rod power histories and for identifying a fuel rod having a maximum internal pressure.

10. The computer program product of claim 9 further including means for computing thermal-mechanical limit data for each fuel rod in the core and for establishing an operational thermal-mechanical limit based on thermal-mechanical limit data associated with the identified fuel rod.

11. A method for demonstrating compliance of a nuclear reactor with fundamental licensing criteria for nuclear fuel rod internal pressure during nuclear reactor operation, comprising the steps of:

a) constructing individual fuel rod power histories for each nuclear fuel rod in the reactor core based on empirical information acquired during previous fuel cycles and the projected operation of the reactor in an upcoming fuel cycle;

b) computing internal pressure data for each fuel rod in the core for an upcoming fuel cycle based on the power histories constructed in step (a);

c) identifying a fuel rod having a maximum internal pressure; and d) confirming that the identified maximum is less than an established licensing limit criteria, wherein the established power limit criteria is based on thermal-mechanical limit data associated with the identified fuel rod.

* * * * *